(12) United States Patent
Takahashi et al.

(10) Patent No.: US 6,731,364 B2
(45) Date of Patent: May 4, 2004

(54) LIQUID CRYSTAL DISPLAY DEVICE

(75) Inventors: Takuya Takahashi, Hitachi (JP); Toshiki Kaneko, Chiba (JP); Katsumi Tamura, Hitachi (JP); Kenichi Onisawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 27 days.

(21) Appl. No.: 10/101,166

(22) Filed: Mar. 20, 2002

(65) Prior Publication Data

US 2003/0063229 A1 Apr. 3, 2003

(30) Foreign Application Priority Data

Sep. 28, 2001  (JP) ........................................ 2001-298993

(51) Int. Cl.[7] .......................................... G02F 1/1343
(52) U.S. Cl. ...................................... 349/139; 349/147
(58) Field of Search ............................. 349/147, 139; 257/59; 438/30

(56) References Cited

U.S. PATENT DOCUMENTS 5,811,835 A * 9/1998 Seiki et al. ................... 257/57
5,994,156 A * 11/1999 Voutsas et al. ............... 438/30
6,081,308 A * 6/2000 Jeong et al. .................. 349/42
6,333,518 B1 * 12/2001 Seo .............................. 257/72
6,433,842 B1 * 8/2002 Kaneko et al. ............... 349/43
6,522,370 B2 * 2/2003 Takahashi et al. ........... 349/43

FOREIGN PATENT DOCUMENTS

| JP | 2000275679 A | * 10/2000 | ............ G02F/1/136 |
| JP | 2000284326 A | * 10/2000 | ......... G02F/1/1365 |
| JP | 2001166336 A | * 6/2001 | ......... G02F/1/1368 |
| JP | 2002009298 A | * 1/2002 | ......... H01L/29/786 |

* cited by examiner

Primary Examiner—Kenneth Parker
Assistant Examiner—David Chung
(74) Attorney, Agent, or Firm—Antonelli, Terry, Stout & Kraus, LLP

(57) ABSTRACT

A liquid crystal display device has image signal lines of a bottom gate type TFT, in which the image signal lines comprise a laminated film formed of a first conductive film disposed as a lower layer and a second conductive film disposed as an upper layer. The first conductive film is made of an alloy comprising Mo as a main ingredient and W, and the second conductive film is made of an alloy comprising Mo as a main ingredient and Zr. The device is capable of satisfying requirements of reduced resistance, improved dry etching resistance, selective wet etching with respect to the gate insulative film, the number of laminated layer of two or less, and tapered fabrication for the cross section.

15 Claims, 16 Drawing Sheets

LIQUID CRYSTAL DISPLAY DEVICE

BACKGROUND OF THE INVENTION

The present invention relates to an active matrix type liquid crystal display device (AM-LCD) driven by thin film transistors (TFT) and a method of manufacture thereof.

In an effort to provide image display devices that have a reduced thickness and weight and are able to attain high definition, the market has moved toward the provision of thin film transistor-driven liquid crystal display devices (TFT-LCD), instead of the existing cathode ray tubes. The conventional TFT-LCD comprises scanning signal lines, image signal lines, thin film transistors formed in the vicinity of intersections between the scanning signal lines and the image signal lines, pixel electrodes connected with the thin film transistors, a gate insulative film and a protection film formed on a glass substrate; and, a counter substrate is provided with a liquid crystal layer disposed between the glass substrate and the counter substrate. In recent years, along with an increased size and an improved definition of the screen of a TFT-LCD, specifications required for a reduction in the resistance of scanning signal lines and image signal lines and an increase in the production yields have become more and more severe. Further, there has also been a demand to reduce the production cost by simplifying the production steps.

For the image signal lines of the bottom gate type amorphous silicon TFT-LCD, those comprising a single layer of a metal film, such as Ti, Ta, Cr, Mo and CrMo, or those made of laminated metal films, such as Mo/Cr, Al/Ti, CrMo/Cr, Mo/Al/Mo, Ti/Al/Ti, Cr/Al/Cr and MoCr/Al/MoCr, have been adopted. In the foregoing, the slash (/) represents the constitution of laminated films in which an upper layer is indicated on the left and a lower layer is indicated on the right of the slash. Such wiring constitutions are properly selected depending on the wiring resistance specifications required for liquid crystal driving, the production performance of a sputtering step, the performance of an etching apparatus, and so on.

Among the various possibilities, the constitution capable of obtaining the lowest wiring resistance can include films employing Al, Al/Ti, Mo/Al/Mo, Ti/Al/Ti, Cr/Al/Cr and MoCr/Al/MoCr, and a similar constitution capable of obtaining the second lowest wiring resistance can include employing pure Mo, Mo and Mo/Cr. Incidentally, Ti or Mo can be laminated as an upper or a lower layer on Al, such as in Ti/Al/Ti or Mo/Al/Mo, in order to improve the contact with the silicon constituting a thin film transistor and a pixel electrode comprising indium oxide or the like as the main ingredient. Further, those simple constitutions providing the lowest load on the sputtering step can include single-layered constitutions of Ti, Ta, Cr, Mo or CrMo, and similar constitutions for providing the second lowest load can include a two-layered constitution of Mo/Cr, Al/Ti. Further, the constitutions capable of selective wet etching for a gate insulative film without the use of a hydrofluoric system etching solution can include Cr, Mo, CrMo, Al/Cr, Mo/Al/Mo, Cr/Al/Cr and MoCr/Al/MoCr. Further, those constitutions capable of forming through holes in the protection insulative film substantially covering a drain electrode and a source electrode without eliminating the wiring film can include Cr, CrMo, Mo/Cr, CrMo/Cr, Cr/Al/Cr and MoCr/Al/MoCr.

The constitutions of the image signal lines described above have respective features, as described previously, but constitutions capable of simultaneously satisfying requirements for reduced wiring resistance, a reduced load on the sputtering step, selective wet etching for the gate insulative film, and formation of the through hole in the protection insulative film by dry etching, have not yet been known.

For example, Ti has a high resistivity, and since buffered hydrofluoric acid is used for wet etching for Ti, selective wet etching with respect to the gate insulative film is difficult. Further, Ta also has a high resistivity, and since buffered hydrofluoric acid is used for wet etching for Ta, selective wet etching with respect to the gate insulative film is also difficult. Further, since it is etched with an $SF_6$, gas, formation of the through holes in the protection insulative film by dry etching is difficult. Further, Cr, CrMo, and CrMo/Cr each have a high resistivity. Also, since Mo is etched by $SF_6$, gas, formation of the through hole in the protection insulative film by dry etching is difficult. Since a Mo layer is rapidly dissolved abnormally upon wet etching in Mo/Cr, patterning is difficult. Since it is necessary for Al/Ti that the through hole has to be formed by dry etching in the protection insulative film and Al has to be etched, the step is complicated. Further, for Mo/Al/Mo, since Mo as a cap layer is etched by $SF_6$ gas, and formation of the through hole in the protection insulative film by dry etching is difficult and also requires three-layered deposition, the sputtering step is subjected to a large load. Similarly, since Ti/Al/Ti, Cr/Al/Cr and MoCr/Al/MoCr each require the deposition of three layers, they impose a great load on the sputtering step.

SUMMARY OF THE INVENTION

A first object of this invention is to attain a constitution of image signal lines capable of simultaneously satisfying the requirements of reduced wiring resistance, a reduced load on a sputtering step, selective wet etching relative to a gate insulative film, formation of a through hole in a protection insulative film by dry etching, and favorable contact with silicon of a thin film transistor and a transparent conductive film constituting a pixel electrode, and to provide a liquid crystal display device using the same. An target value for the wiring resistance is assumed to be 170 nΩ/m or lower of an average conductivity defined as a product of sheet resistance and overall film thickness. This average conductivity is at a level lower than 180 nΩ/m that can be attained with a single Cr layer film or single CrMo layer film.

A target for reduction in the load imposed on the sputtering step involves setting the number of laminated layers to two or less. The selective wet etching with respect to the gate insulative film is such that etching can be conducted with a chemical solution excluding those capable of chemically attacking the gate insulative film, such as a buffered hydrofluoric acid or an alkali solution giving damage to a resist. Further, from the viewpoint of the simplicity of the steps, it is a necessary condition that upper and lower layers can be etched simultaneously on a wiring constituted of laminated layers. Further, it is a necessary condition that the cross section of the wirings can be fabricated into a tapered shape. For the formation of the through hole in the protection insulative film by dry etching, it is necessary that the contact layer of wirings has a durability to dry etching using an $SF_6$ gas for establishing contact between the wirings and the pixel electrode. As a matter of fact, it is difficult to use an alloy comprising Al as a main ingredient for the contact layer.

A second object of this invention is, in addition to attaining the foregoing first object, to provide a good matching property with a process for forming scanning signal lines. Since a particularly lowered resistance is required for the scanning signal lines, it is desirable that a film constituting them is a laminated film containing an alloy comprising aluminum as the main ingredient. When the etching solution for fabricating the same and that for fabricating the image signal lines can be used in common, this is preferred in view of the consequent reduction in the manufacturing cost.

According to a first aspect of the present invention, a liquid crystal display device comprises: a pair of substrates; a liquid crystal layer disposed between the pair of substrates; a plurality of scanning signal lines formed on one of the pair of substrates; a plurality of image signal lines crossing the scanning signal lines in a matrix arrangement; thin film transistors formed in the vicinity of intersections of the scanning signal lines and the image signal lines; pixel electrodes connected with the thin film transistors; a gate insulative film substantially covering the scanning signal lines; and a protection insulative film substantially covering the image signal lines and the thin film transistors. At least one of the signal lines of the scanning signal lines and the image signal lines is made of a two-layered film of a first conductive film as a lower layer and a second conductive film as an upper layer, and the first conductive film is made of an alloy comprising molybdenum as a main ingredient and contains tungsten, while the second conductive film is made of an alloy comprising molybdenum as a main ingredient and contains zirconium.

Preferably, the first conductive film may be made of an alloy comprising molybdenum as a main ingredient and containing tungsten, and the second conductive film may be made of an alloy comprising molybdenum as a main ingredient and containing 4% by weight or more of zirconium.

Preferably, the average conductivity defined as a product of the sheet resistance and the entire film thickness of the two-layered film may be 170 nΩ/m or less.

Preferably, a cross section at a fabrication end of the first conductive film may have a forwardly tapered shape.

According to a second aspect of the invention, a liquid crystal display device comprises: a pair of substrates; a liquid crystal layer disposed between the pair of substrates; a plurality of scanning signal lines formed on one of the pair of substrates; a plurality of image signal lines crossing the scanning signal lines in a matrix arrangement; thin film transistors formed in the vicinity of intersections between the scanning signal lines and the image signal lines; pixel electrodes connected with the thin film transistors; a gate insulative film substantially covering the scanning signal lines; and a protection insulative film substantially covering the image signal lines and the thin film transistors. The image signal lines and a source and drain electrodes of the thin film transistor are made of a two-layered film of a first conductive film disposed as a lower layer and a second conductive film disposed as an upper layer, the first conductive film being directly connected with silicon constituting the thin film transistor, while the second conductive film is directly connected with the pixel electrode by way of a through hole disposed in the protection insulative film. The first conductive film is made of an alloy comprising molybdenum as a main ingredient and containing tungsten, and the second conductive film is made of an alloy containing zirconium.

Preferably, the first conductive film may be made of an alloy comprising molybdenum as a main ingredient and containing tungsten, and the second conductive film may be made of an alloy comprising molybdenum as a main ingredient and containing 4% by weight or more of zirconium.

Preferably, the average conductivity defined as a product of the sheet resistance and the overall film thickness of the two layered film may be 170 nΩ/m or less.

Preferably, a cross section at a fabrication end of the first conductive film may have a forwardly tapered shape. Preferably, the scanning signal lines may be made of a laminated film of an alloy comprising aluminum as a main ingredient and an alloy comprising molybdenum as a main ingredient.

Preferably, the pixel electrode may be made of a mixed oxide of indium oxide, tin oxide and zinc oxide.

According to a third aspect of the invention, a liquid crystal display device comprises: a pair of substrates; a liquid crystal layer disposed between the pair of substrates; a plurality of scanning signal lines formed on one of the pair of substrates; a plurality of image signal lines crossing the scanning signal lines in a matrix arrangement; thin film transistors formed in the vicinity of the intersections of the scanning signal lines and the image signal lines; a gate insulative film substantially covering the scanning signal lines; a protection insulative film substantially covering the image signal lines and the thin film transistors; and at least a pair of pixel electrodes and counter electrodes formed on one of the pair of substrates within a plurality of pixels formed in regions surrounded with the plurality of scanning signal lines and the plurality of image signal lines. An image signal is supplied to the pixel electrode by way of the thin film transistor that is driven based on the supply of a scanning signal from the scanning signal line, and a reference voltage is supplied to the counter electrode by way of the counter voltage signal line formed over the plurality of pixels. The pixel electrode is made of a two-layered film of a first conductive film disposed as a lower layer and a second conductive film disposed as an upper layer, and the first conductive film is made of an alloy comprising molybdenum as a main ingredient and containing tungsten, while the second conductive film is made of an alloy containing zirconium.

Preferably, the first conductive film may be made of an alloy comprising molybdenum as a main ingredient and containing tungsten, and the second conductive film is made of an alloy comprising molybdenum as a main ingredient and containing 4% by weight or more of zirconium.

Preferably, the average conductivity defined as a product of the sheet resistance and the overall film thickness of the two layered film may be 170 nΩ/m or less.

Preferably, a cross section at a fabrication end of the first conductive film may have a forwardly tapered shape.

According to a fourth aspect of the invention, a liquid crystal display device comprises: a pair of substrates; a liquid crystal layer disposed between the pair of substrates; a plurality of scanning signal lines formed on one of the pair of substrates; a plurality of image signal lines crossing the scanning signal lines in a matrix arrangement; thin film transistors formed in the vicinity of the intersections between the scanning signal lines and the image signal lines; pixel electrodes connected with the thin film transistors; a gate insulative film substantially covering the polycrystal silicon of the thin film transistors; an interlayer insulative film for substantially covering the scanning signal lines and insulating the scanning signal lines from the image signal lines; and a protection insulative film substantially covering the image signal lines. The gate electrodes of the thin film transistors may be made of a two-layered film consisting of a first conductive layer disposed as a lower layer and a second conductive layer disposed as an upper layer. The first conductive film is made of an alloy comprising molybdenum as a main ingredient and containing tungsten, and the second conductive film is made of an alloy containing zirconium.

The object of this invention can be attained by the constitutions described above. The concept of the invention will be described below.

Metal elements with relatively low resistivity include, Ag, Cu, Al, Mo and W, when poisonous elements and those elements which are considered to be difficult for film deposition by sputtering, such as noble metals, alkali metals, alkaline earth metals and ferromagnetic materials, are excluded from the metal elements in the periodical table. Among them, Ag, Cu and Al each have poor contact with the silicon used in a thin film transistor or a transparent conductive film that constitutes a pixel electrode and they require a so-called barrier metal or cap metal. That is, for connecting Ag, Cu or Al with silicon and a transparent conductive film, it is necessary to laminate Mo or the like on an upper layer and a lower layer of Ag, Cu or Al. In this case, the metal film has a three-layered constitution, which remarkably increases the load imposed on a sputter film deposition step.

Further, W requires a buffered hydrofluoric acid or alkali solution for wet etching fabrication. However, the buffered hydrofluoric acid damages the glass substrate or the SiN of the gate insulative film, while the alkali solution damages the resist, so that it is difficult to use them for the wiring forming step.

As a result of the considerations described above, Ag, Cu, Al and W have been judged not suitable to the object of the invention, while the remaining Mo and alloys thereof with a high melting metal (Ti, Cr, Zr, Nb, Hf, Ta and w) require no barrier metal or cap metal and can be wet etched by using a mixed acid of phosphoric acid-nitric acid. However, pure Mo has no durability to $SF_6$ dry etching upon fabrication of through holes in the SiN film. Further, it is difficult to fabricate the wiring cross section into a tapered shape by wet etching. In view of the above, laminating and alloying of the wiring film are considered with the following approach.

At first, for forming the wiring cross section into a tapered shape, the upper layer, in the two-layered film, is provided with a relatively high wet etching rate and is formed as a relatively thin film, while the lower layer is provided with a relatively low wet etching rate and is formed as a relatively thick film. Further, the upper layer is provided with durability to dry etching, while the lower layer is adapted to serve as a conductive layer. That is, the upper layer is required for a high wet etching rate and high dry etching durability, while the lower layer is required for a low wet etching rate and low resistivity. The present inventors have made a study of the property of alloys formed by adding a second element to Mo and have found Mo alloys capable of satisfying the foregoing required characteristics.

FIG. 15 shows a wet etching rate and $SF_6$ dry etching rate of Mo alloys with addition of Ta, Cr, Ti, Hf and Zr, respectively, to Mo. For each of the additive elements, the wet etching rate and the dry etching rate are lowered as the amount of additive increases. Although not illustrated, when W or Nb is added to Mo, a similar trace as in the case of adding Ta is obtained. Among the additive elements, Zr is an additive element having the greatest ratio with respect to the amount of reduction of the dry etching rate relative to the amount of reduction of the wet etching rate, and Hf is next to Zr. When the material cost is considered for Zr and Hf, it is apparent that Hf is outstandingly expensive. Accordingly, the optimum element as the upper layer for the two-layered film is an alloy formed by adding Zr to Mo. In order to provide the image signal line with the required dry etching durability, it is desirable that Zr is added by 4% by weight or more.

FIG. 16 shows the wet etching rate and the resistivity of the Mo alloys with addition of W, Ta, Nb, Hf and Zr, respectively, to Mo. In each of the additive elements, the wet etching rate lowers and the resistivity increases as the amount of additive increases. Among the additive elements, W is an additive element showing a minimum ratio of increasing resistivity relative to the amount of reduction of the wet etching rate, and Ta is next to W. Although not illustrated, Zr and Hf are additive elements showing an extremely large ratio of increasing resistivity relative to the amount of reduction of the wet etching rate. In view of the foregoing, the optimal lower layer for the two-layered film is made of an alloy in which W is added to Mo. The amount of W added in the MoW alloy as the lower layer depends on the amount of Zr added in the MoZr alloy for the upper layer. That is, in order to provide a wiring cross section having a favorable tapered shape, W has to be added within a range such that the wet etching rate for the lower layer is less than that for the upper layer and at an addition amount as low as possible so as to attenuate a rise in the resistivity.

FIG. 17 illustrates a cross sectional shape of a two-layered film comprising the MoZr alloy for the upper layer and the MoW alloy for the lower layer, as described above, which is subjected to wet etching. It is wet etched into a tapered cross sectional shape in which the MoZr layer disposed as the upper layer is retracted. The etching solution is a mixed acid containing phosphoric acid -nitric acid used as an aluminum etching solution, and when a film containing an aluminum alloy is used for the scanning signal lines, the etching solution can be used in common.

Further, when a film containing an aluminum alloy is used for the scanning signal line, the yield in view of the disconnection of the scanning signal line is worsened when polycrystal indium tin oxide is adopted for the pixel electrode. This is because dissolution disconnection is caused by intrusion of an intense halogenic acid, such as hydrobromic acid, as an etching solution for the polycrystal indium tin oxide as far as scanning signal lines. Dissolution disconnection is essentially eliminated by adopting an amorphous transparent conductive film, such as one made of a mixed oxide of indium oxide, tin oxide and zinc oxide, as the pixel electrode and changing the etching solution with a mild etchant, such as oxalic acid. Contact characteristics between a mixed oxide of indium oxide, tin oxide and zinc oxide and the MoZr alloy described above are favorable, and the transparent conductive film can be adopted as the pixel electrode.

In the case of the scanning signal lines, since there is no requirement for considering contact with silicon, an aluminum alloy of lower resistance can be adopted as the lower layer for the wiring film. However, when the polycrystal indium tin oxide is used as the pixel electrode, as described above, the use of an aluminum alloy is not desirable in view of the disconnection yield. The advantage of adopting the polycrystal indium tin oxide is that the connection resistance is low and stable at the wiring terminal formed simultaneously with the pixel electrode. In this case, it is possible to apply the two-layered film constitution, in which the upper layer is made of the MoZr alloy and the lower layer is made of the MoW alloy as described above, to the scanning signal line. As described above, in the case of the two-layered film constitution, since the tapered shape at the fabrication end is satisfactory, the coverage and the image signal line overriding characteristics of the gate insulative film are improved.

DETAILED DESCRIPTION OF THE PREFERRED EMBODIMENTS

Embodiment 1

<Equivalent Circuit>

Figure 3:
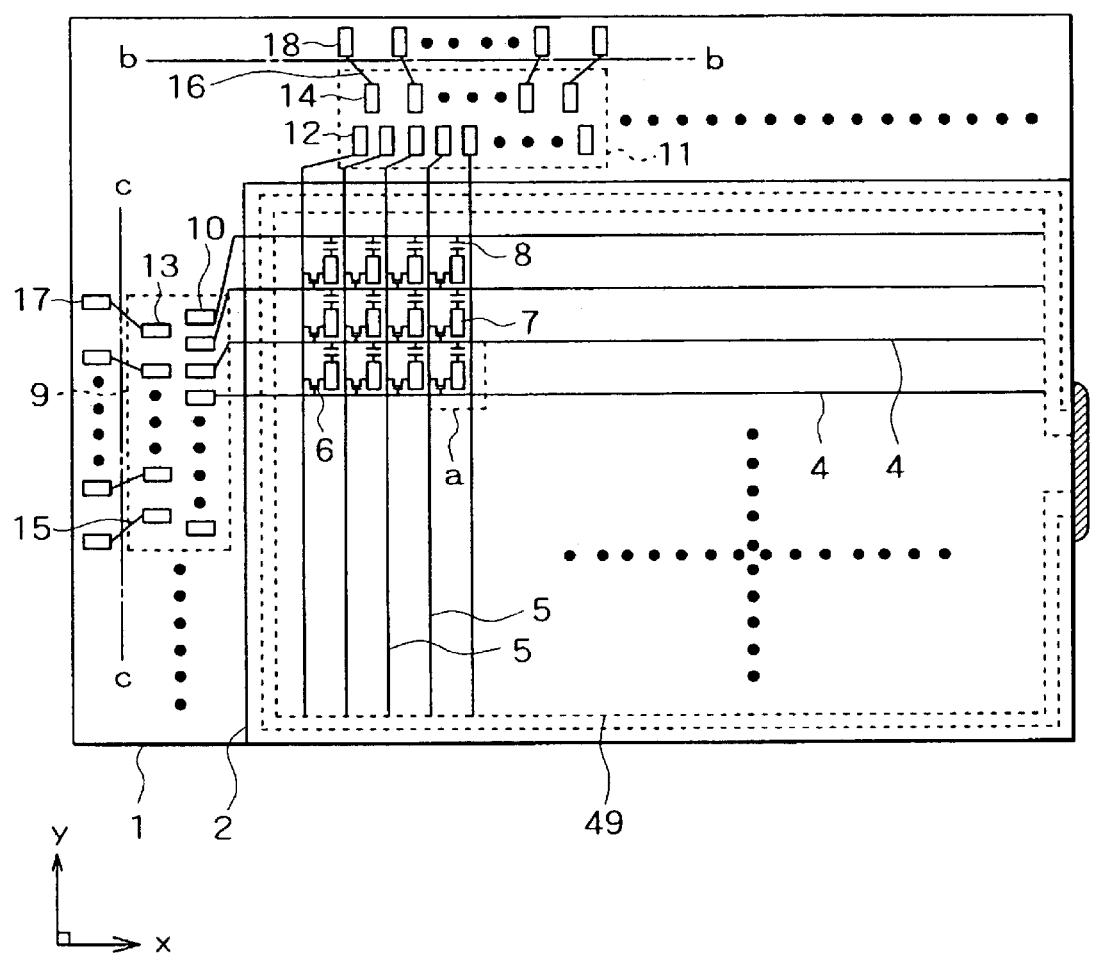
FIG. 3 is a schematic diagram showing an equivalent circuit in a liquid crystal display device according to an embodiment of the invention.

FIG. 3 is an equivalent circuit diagram showing the structure of a liquid crystal display device according to Embodiment 1 of this invention. While FIG. 3 is a circuit diagram, it is drawn so as to correspond to an actual geometrical arrangement.

In Embodiment 1 of FIG. 3, a transparent substrate 1 and a transparent substrate 2 are opposed to each other with a liquid crystal layer disposed therebetween.

At the surface of the transparent substrate 1 on the side of the liquid crystals, gate (scanning) signal lines 4 are formed so as to extend in the direction x, and they are arranged in parallel with each other along the direction y. Drain (image) signals lines 5 are also formed thereon so as to extend in the direction y, while being insulated from the gate signal lines 4, and they are arranged in parallel with each other along the direction x. A rectangular region surrounded by the gate (scanning) signal lines 4 and the drain (image) signal lines 5 constitutes a pixel region. Pixel regions are arranged in the form of an array to constitute a display section.

A thin film transistor 6 driven by a scanning signal (voltage) from one of the gate signal lines 4 and a pixel electrode 7 supplied with an image signal (voltage) from the drain signal line 5 by way of the thin film transistor 6 are formed in each of the pixel regions.

Since the length of the signal lines increases as the size of the liquid crystal display device increases, the resistance of the gate signal line 4 and the drain signal line 5 is increased when the size of the liquid crystal display device is increased. Further, since the signal line width decreases as the definition of the liquid crystal display device becomes finer, the resistance of the gate signal line 4 and drain signal line 5 is increased in a liquid crystal display device of high definition. Then, when the resistance of the signal lines 4 and 5 is increased, since the voltage waveform of the scanning signal and the image signal becomes dull, and insufficient signal voltage is supplied to the thin film transistor 6. As a result, significant deterioration occurs in the image quality, such as the gradient of brightness.

Further, a capacitance element 8 is formed between the pixel electrode 7 and one of the gate signal lines 4 adjacent to another gate signal line 4. The capacitance element 8 stores the image signal supplied to the pixel electrode 7 for a long time when the thin film transistor 6 is turned off.

In each of the pixel regions, an electric field is generated between counter electrodes (not illustrated) and the pixel electrode 7 to control the light transmittance of the liquid crystals disposed between each of these electrodes. The counter electrodes are formed in common with each of the pixel regions on the surface of the other transparent substrate 2 on the side facing the liquid crystals.

One end of each gate signal line 4 extends to one side (left side in the drawing) of the transparent substrate. A terminal portion 10 to be connected with bumps of a semiconductor integrated circuit 9 of a vertical scanning circuit mounted on the transparent substrate 1 is formed at the extended portion of each gate signal line 4. One end of each drain signal line 5 extends to one side (upper side in the drawing) of the transparent substrate 1. A terminal portion 12 to be connected with bumps of a semiconductor integrated circuit 11 of an image signal driving circuit mounted on the transparent substrate 1 is formed at the extended portion of each drain signal line 5. The semiconductor integrated circuits 9 and 11 are completely mounted, respectively, on the transparent substrate 1 by the so-called COG system.

Respective bumps on the input side of the semiconductor integrated circuits 9 and 11 are connected to terminal portions 13 and 14 formed on the transparent substrate 1. The terminal portions 13 and 14 are connected by way of wiring layers 15 and 16 with terminal portions 17 and 18, respectively, which are disposed on the periphery of the transparent substrate 1 at a portion nearest to the end face.

The transparent substrate 2 is arranged relative to the transparent substrate 1 so as to expose a region of the substrate 1 on which the semiconductor integrated circuit is mounted. For this purpose, the substrate 2 is smaller in size than the transparent substrate 1.

The transparent substrate 2 is secured to the transparent substrate 1 by means of a sealing material 47 formed on the periphery of the transparent substrate 2. The sealing material also has a function of encapsulating the liquid crystals between the transparent substrates 1 and 2.

In the structure described above, while a liquid crystal display device employing the COG system has been explained, this invention is applicable also to a liquid crystal display device which uses a TCP (Tape Carrier Package) system. The TCP system is a packaging system for forming a pattern by photolithography on a flexible tape to form a tape carrier and mounting a semiconductor integrated circuit chip by a TAB method (Tape Automated Bonding). Output terminals of the package are connected with a terminal portion formed on a transparent substrate SUB1 and input terminals thereof are connected to a terminal portion on a printed substrate disposed in the vicinity of the transparent substrate 1.

<Structure of Pixel>

Figure 1:
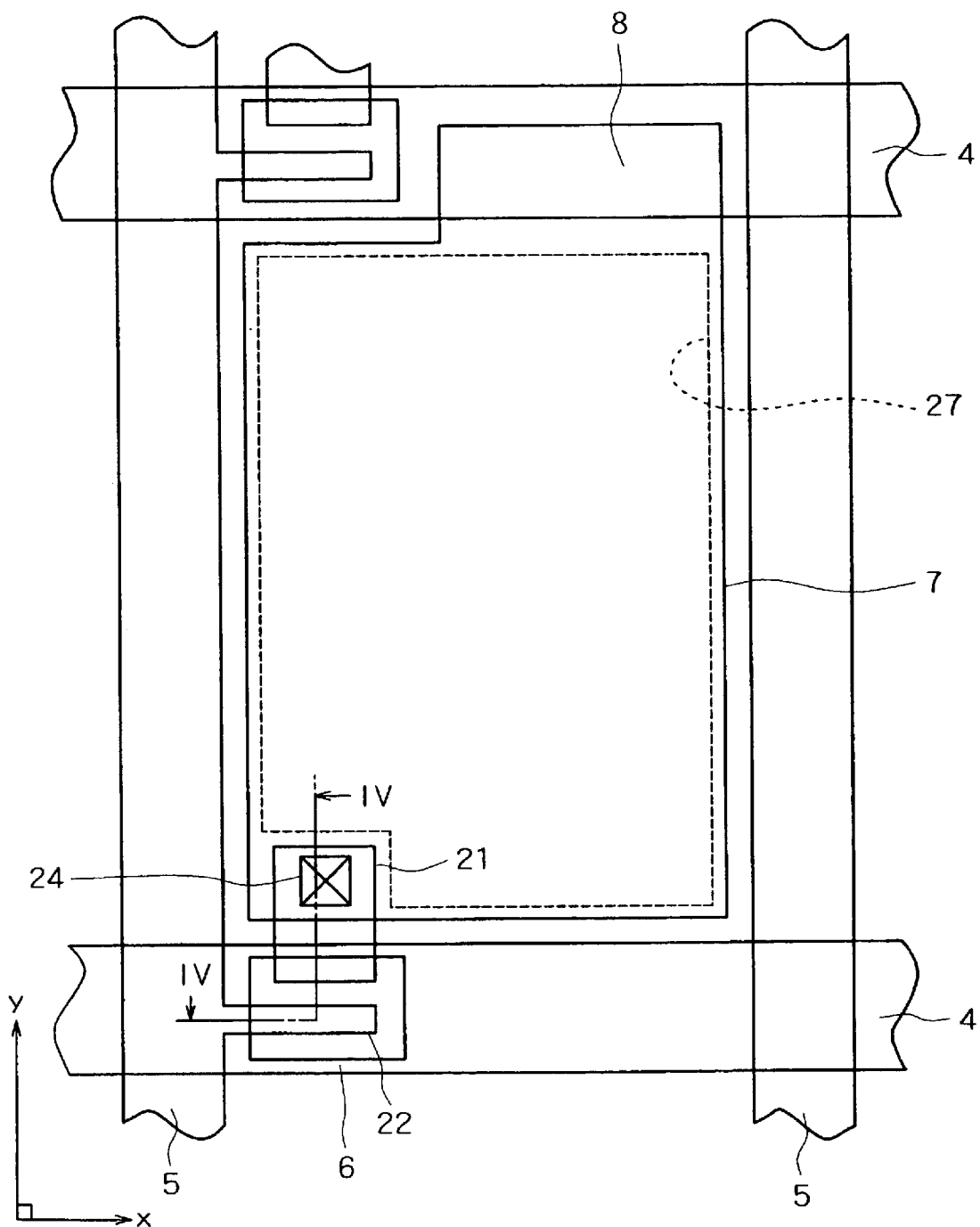
FIG. 1 is a plan view showing a main portion of a pixel in a liquid crystal display device according to an embodiment of the present invention.
Figure 2:
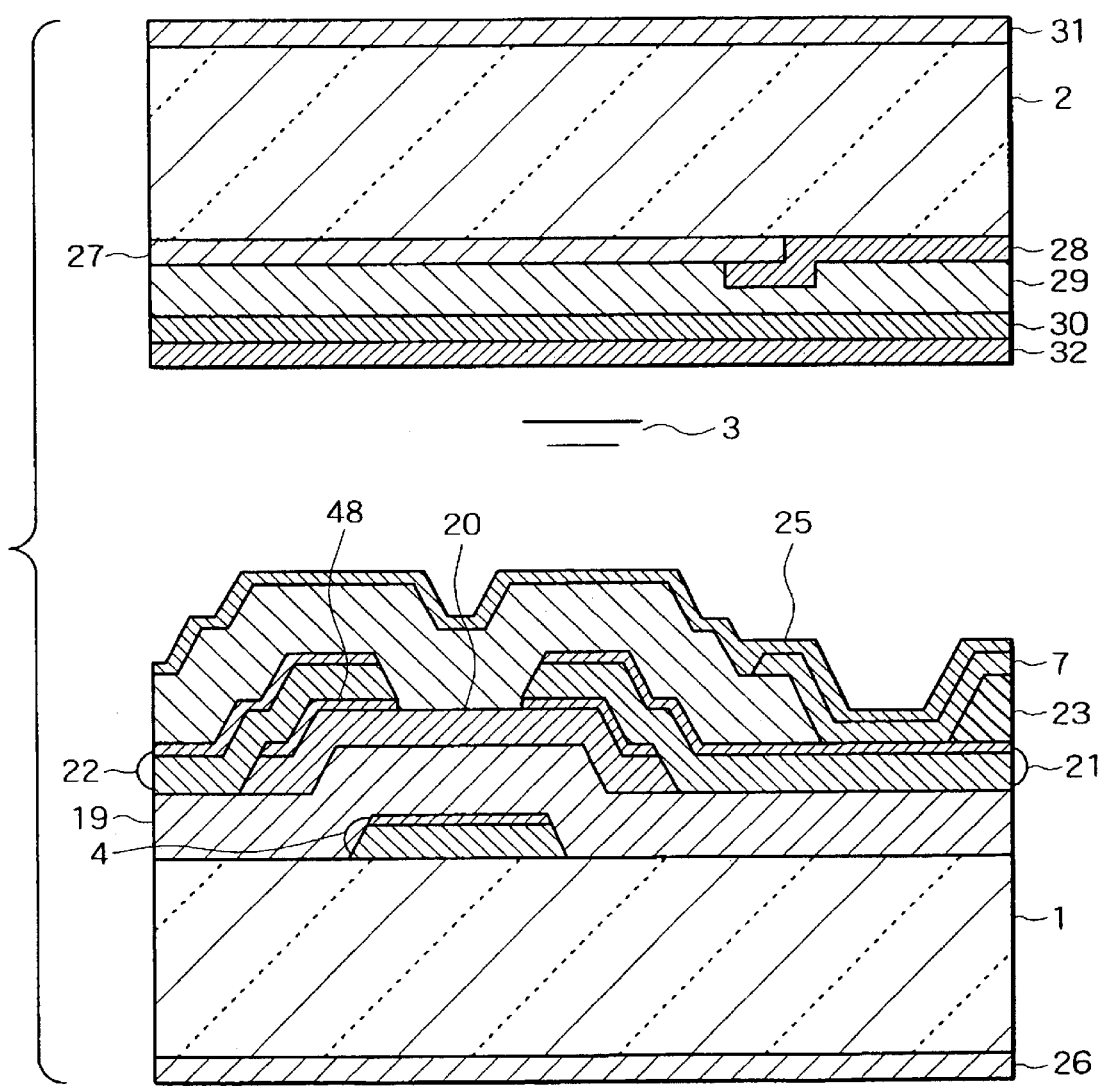
FIG. 2 is a cross sectional view taken along line IV—IV in FIG. 1.

Referring now to FIG. 1 and FIG. 2, FIG. 1 is a plan view showing the structure of a pixel region of the transparent substrate 1, which corresponds to a portion indicated by a dotted frame "a" in FIG. 3. FIG. 2 is a cross sectional view taken along line IV—IV in FIG. 1.

In FIGS. 1 and 2, the gate signal lines 4, which extend in the direction X and are arranged in parallel with the direction y, are formed on the surface of the transparent substrate 1 on the side facing the liquid crystals.

The gate signal line 4 has a two-layered structure in this Embodiment 1, in which a lower layer is, for example, made of an alloy comprising Al as a main ingredient, while an upper layer is made of an alloy comprising Mo as a main ingredient, such as a MoZr alloy.

Such a two-layered structure can provide an effect of greatly lowering the wiring resistance of the gate signal lines and forming the cross section into a forwardly tapered shape upon etching. Other effects will be apparent from subsequent explanations.

An insulative film 19, for example, made of SiN, is formed on the surface of the transparent substrate 1 so as to cover the gate signal line 4. The insulative film 19 functions as an interlayer insulative film for the drain signal line 5 (to be described later) with respect to the gate signal line 4, functions as a gate insulative film for a thin film transistor 6 (to be described later) and functions as a dielectric film for the capacitance element 8 (to be described later).

A semiconductor layer 20, for example, made of a-Si, is formed at a lower left portion of the pixel region that overlaps with the gate signal line 4. When a source electrode 21 and a drain electrode 22 are formed on the upper surface of the semiconductor layer 20, a semiconductor layer of an MIS type thin film transistor 6 having a portion of the gate signal line 4 as a gate electrode is formed.

The source electrode 21 and the drain electrode 22 of the thin film transistor 6 are formed simultaneously with the drain signal line 5 formed on the insulative film 19. That is, when a portion of the drain signal lines 5, which extend in the direction y and are arranged in parallel with the direction x, as seen in FIG. 1, are formed by being extended as far as the upper surface of the semiconductor layer 20, the extended portion forms the drain electrode 22 of the thin film transistor 6. In this case, an electrode which is spaced apart from the drain electrode 22 constitutes the source electrode 21. Since the source electrode 21 is connected with a pixel electrode 7 (to be described later), it has a portion which extend somewhat to a central portion of the pixel region in order to ensure the connection.

The drain signal line 5 has a two-layered structure in this Embodiment 1, in which a lower layer thereof is a relatively thick layer made of an MoW alloy (for example, 17 wt % W content) and an upper layer thereof is a relatively thin layer made of an MoZr alloy (for example, 8 wt % Zr content).

The upper layer is made of MoZr alloy, in order to provide durability to dry etching by fluorine plasmas upon forming a contact hole 24 in a protection insulative film 23 and so as not to eliminate the source electrode 21. It also serves as a contact with the pixel electrode 7. The lower layer is made of MoW alloy, in order to lower the resistance of the drain signal lines 5. It also serves as the contact with the semiconductor layer 20 of the thin film transistor 6. Further, the MoZr alloy has less wet etching rate compared with MoW, and such a two-layered film enables tapering fabrication.

A semiconductor layer doped with impurities is formed at the interface between each of the drain electrode 22 and the source electrode 21 and the semiconductor layer 20. The doped semiconductor layer functions as a contact layer 48.

A protection insulative film 23, for example, made of SiN, is formed on the surface of the transparent substrate 1 formed with the drain signal line 5 (drain electrode 22, source electrode 21) as described above, to cover the drain signal lines 5 and so on. The protection insulative film 23 is disposed so as to avoid direct contact of the thin film transistor 6 with the liquid crystals.

A contact hole 24 is formed by dry etching of fluorine plasmas for the purpose of exposing a portion of the extended portion of the source electrode 21 of the thin film transistor 6 and causing the portion to connect with the pixel electrode 7.

A transparent electrode 7 is formed on the upper surface of the protective insulative film 23, while covering most of the portion of the pixel region. The transparent electrode 7 is made of any of indium-tin-zinc oxide (ITZO), indium-tin oxide (ITO), indium zinc oxide (IZO) or indium germanium oxide (IGO). ITZO is employed in this embodiment. Since ITZO is deposited as an amorphous film, it can be fabricated by a mild etching solution, such as oxalic acid. Accordingly, even when an alloy comprising Al as a main ingredient is used for the gate signal lines 4, as in this embodiment, reduction of the yield by dissolution disconnection does not occur. The pixel electrode 7 is formed so as to also cover the contact hole 24 of the protective insulative film 23, and it is connected with the MoZr alloy of the source electrode 21 of the thin film transistor 6. The contact resistance between ITZO and MoZr alloys is low, and so a favorable electric connection can be obtained.

On the surface of the transparent substrate 1, in which the pixel electrode 7 is formed as described above, an orientation film 25 is formed so as to also cover the pixel electrode 7. The orientation film 25 is made, for example, of a resin, and a rubbing treatment is applied in a certain direction to the surface thereof. The orientation film 25 is in contact with the liquid crystal layer 3 to determine the initial orientation direction of the liquid crystal molecules.

A polarization plate 26 is mounted on the surface of the transparent substrate 1 on the side opposite to the liquid crystal layer 3.

On the other hand, a black matrix 27 is formed at the surface of the transparent electrode substrate 2 on the side facing the liquid crystals so as to define each of the pixel regions. The black matrix 27 is disposed so as to prevent irradiation of external light to the thin film transistor 6 and improve the contrast of display.

Further, a color filter 28, having a color corresponding to each pixel region, is formed at an opening that forms a light transmitting region and forms a substantial pixel region. For the color filter 28, filters of an identical color are used in each of pixel regions arranged in parallel with the direction y, and filters of red (R), green (G) and blue (B) are sequentially arranged repeatedly on every pixel region in the direction x.

A planarization film 29, comprising a resin formed, for example, by coating, is disposed on the surface of the transparent substrate 2 formed with the black matrix 27 and the color filters 28, while covering also the black matrix 27, so that a step caused by the black matrix 27 and the color filter 28 does not appear on the surface.

A counter electrode 30, made, for example, of ITO, is formed in common with each of the pixel regions on the surface of the planarization film 20. An electric field corresponding to the image signal (voltage) is generated between the pixel electrode 7 in each of the pixel regions and the counter electrode 30 so as to control the direction of orientation of the liquid crystal molecules and control the light transmittance based on an appropriate combination of the polarization plate 26, described previously, and a polarization plate 31, to be described subsequently.

Further, an orientation film 32 is formed on the surface of the transparent electrode 2 covering the counter electrode 30. The orientation film 32 is made, for example, of a resin, and it is subjected to a rubbing treatment in a certain direction on the surface thereof. The orientation film 32 is in contact with the liquid crystal layer 3 and determines the initial orientation direction of the liquid crystal molecules.

A polarization plate 31 is mounted on the surface of the transparent substrate 2 on the side opposite to the liquid crystal layer 3.

<Constitution of Terminal Portion>

Figure 4A:
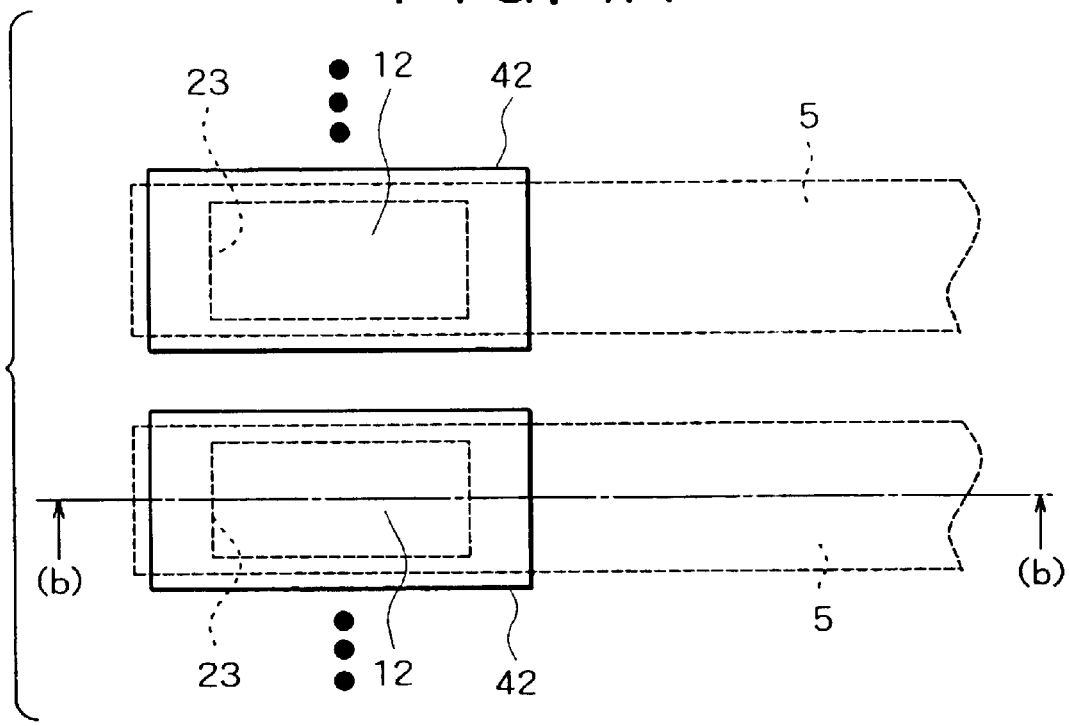
FIG. 4A is a plant view showing a pair of main portions (terminal portions) of a liquid crystal display device according to an embodiment of the invention.
Figure 4B:
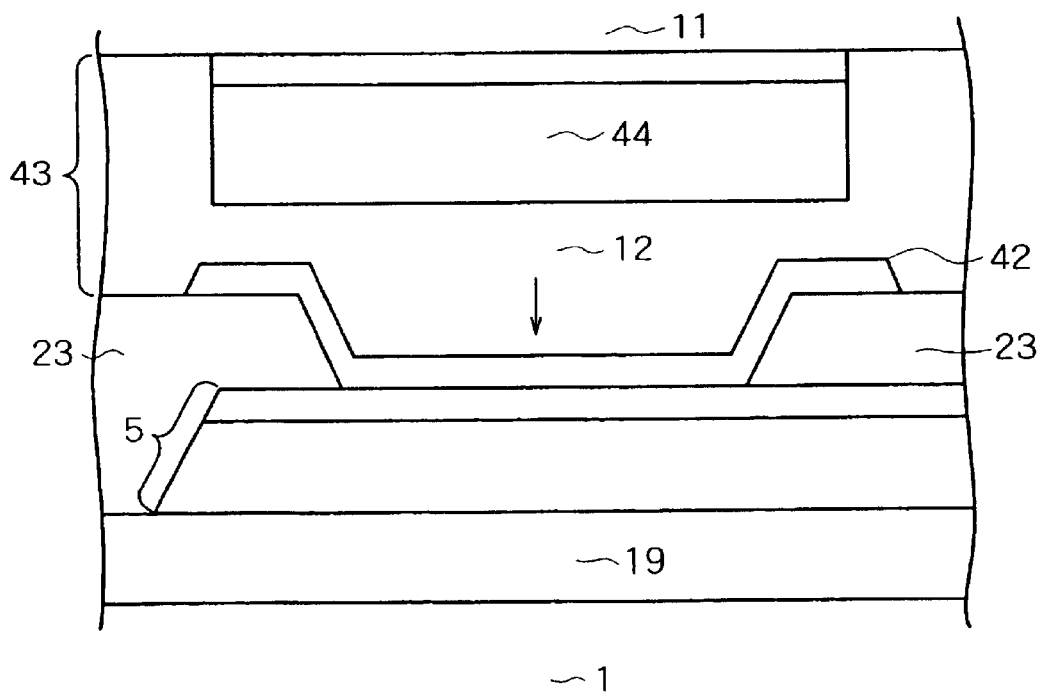
FIG. 4B is a cross-sectional view taken along line b—b in FIG. 4A.
Figure 5A:
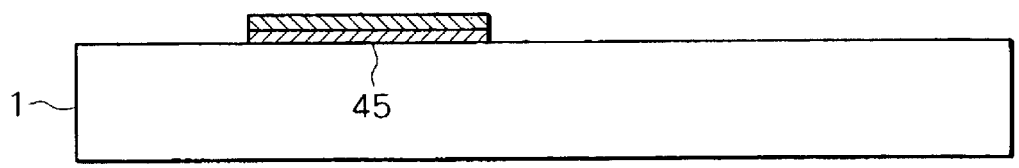
FIGS. 5A through 5C are sectional views and FIG. 5D is a process flow diagram showing steps in a method of manufacture of a liquid crystal display device according to an embodiment of this invention.
Figure 5B:
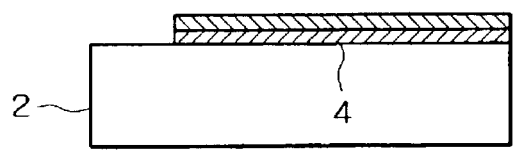
Figure 5C:
Figure 5D:
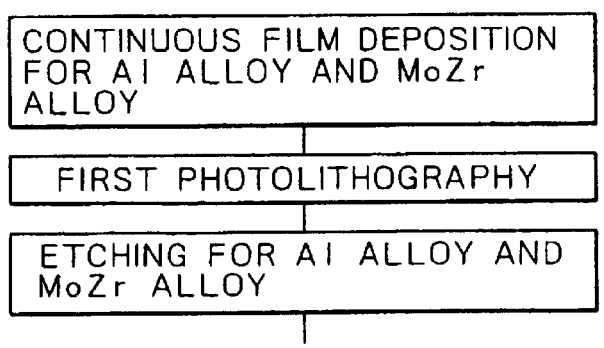
Figure 6A:
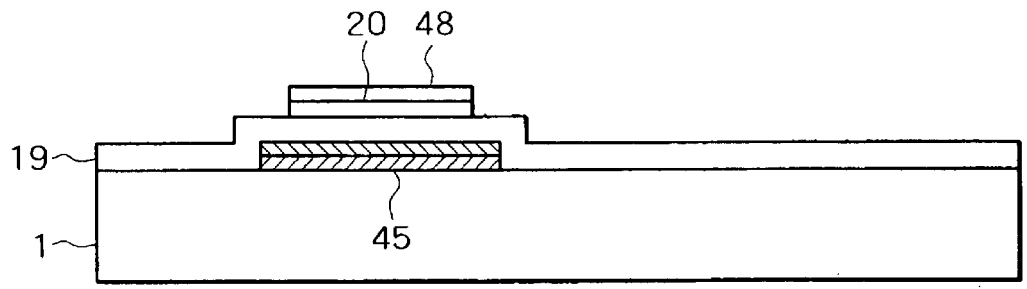
FIGS. 6A through 6C are sectional views and FIG. 6D is a process flow diagram showing additional steps of the manufacturing method following the steps illustrated in FIGS. 5A to 5D.
Figure 6B:
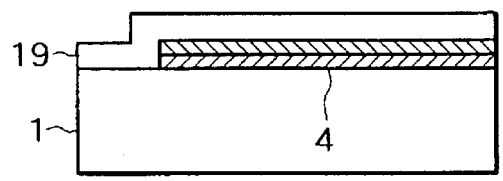
Figure 6C:
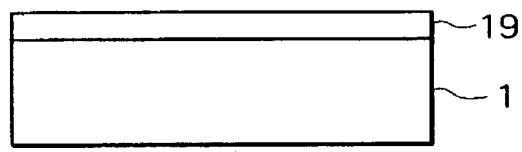
Figure 6D:
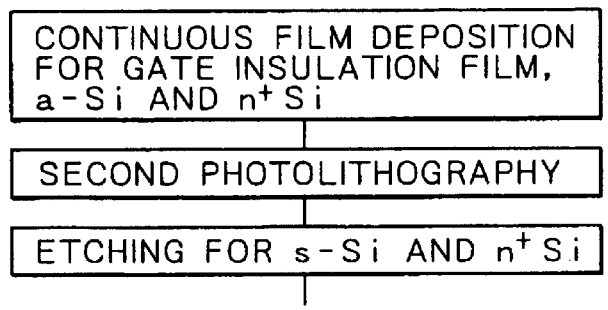
Figure 7A:
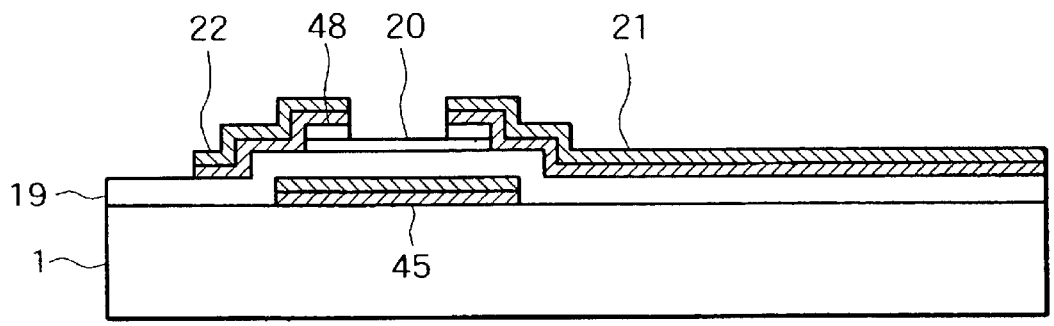
FIGS. 7A through 7C are sectional views and FIG. 7D is a process flow diagram showing additional steps of the manufacturing method following the steps illustrated in FIGS. 6a to 6D.
Figure 7B:
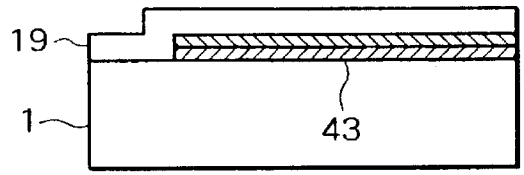
Figure 7C:
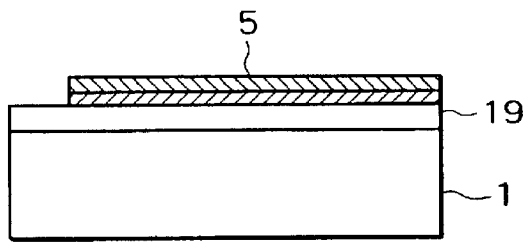
Figure 7D:
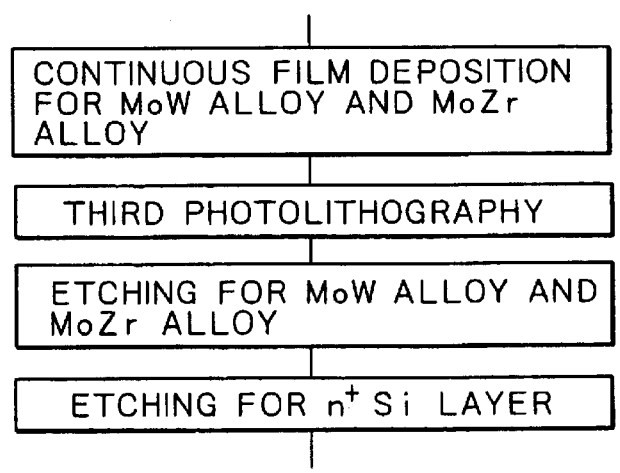
Figure 8A:
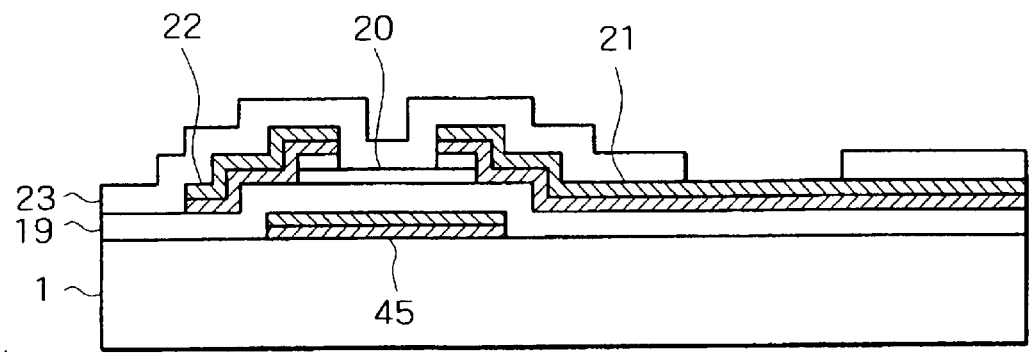
FIGS. 8A through 8C are sectional views and FIG. 8D is a process flow diagram showing additional steps of the manufacturing method following the steps illustrated in FIGS. 7A to 7D.
Figure 8B:
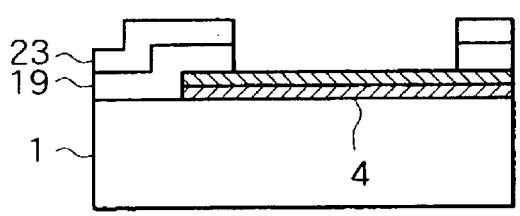
Figure 8C:
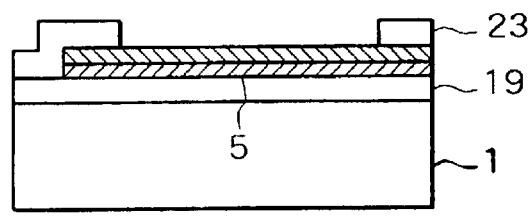
Figure 8D:
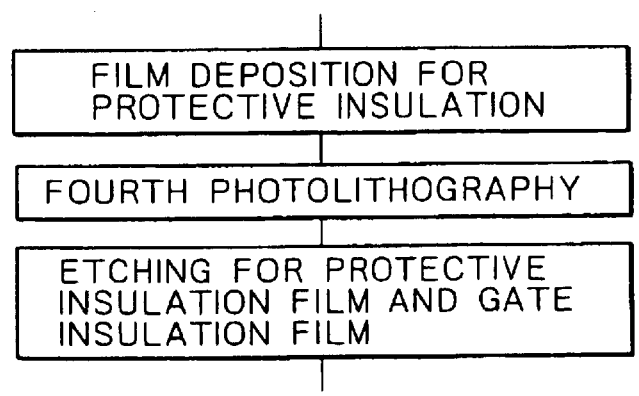
Figure 9A:
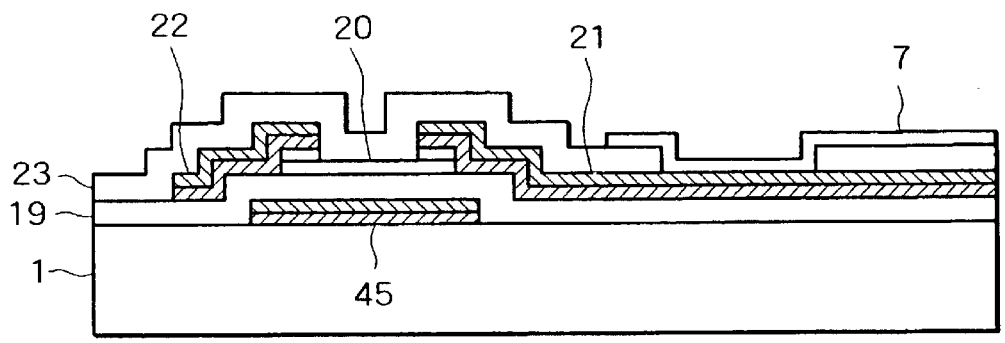
FIGS. 9A through 9C are sectional views and FIG. 9D is a process flow diagram showing additional steps of the manufacturing method following the steps illustrated in FIGS. 8A to 8D.
Figure 9B:
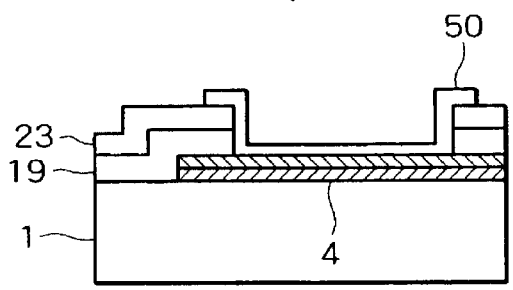
Figure 9C:
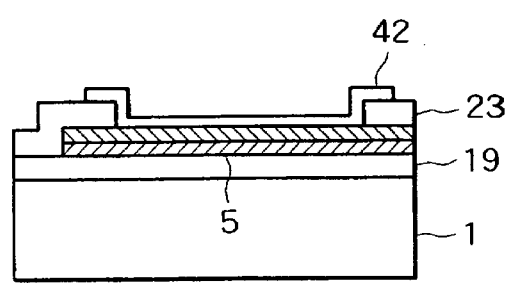
Figure 9D:
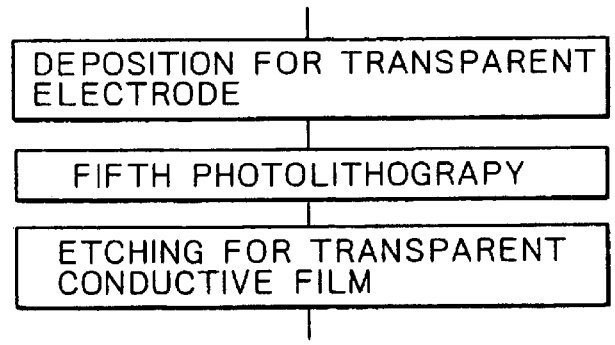

FIGS. 4A and 4B are views showing the constitution of the drain terminal portion 12, in which FIG. 4A is a plan view showing two out of plural drain terminal portions 12 formed in parallel with one another, and FIG. 4B is a cross sectional view taken along line b—b in FIG. 4A.

At first, drain signal lines 5 extending from the display section are formed on the surface of the transparent substrate 1. Each drain signal line 5 comprises a two-layered film having an upper layer made of MoZr alloy and a lower layer made of MoW alloy, as described previously.

The drain signal line 5 is initially covered with the protection insulative film 23 made of SiN and then exposed from the protection insulative film 23 by boring a hole in a region for forming the terminal portion. The boring in the protection insulative film 23 is preferably conducted by fluoro-dry etching gas. The dry etching is excellent compared with wet etching from the point of view of the fabrication accuracy and the controllability for the processing time and is advantageous for fabrication, such as boring in the terminal portion and fabrication for the contact hole in the pixel portion. Further, the MoZr alloy used as the upper layer of drain signal line 5 has a high dry etching durability and is not removed upon etching.

At the exposed portion of the signal line in the terminal portion, a conductive oxide film 42 made of ITZO (Indium-Tin-Zinc-Oxide) is laminated. As the material for the conductive oxide film 42, ITO (Indium-Tin-Oxide), IZO (Indium-Zinc-Oxide) or IGO (Indium-Germanium-Oxide) may be selected. However, while the ITO film is excellent in that the terminal connection resistance is low, it involves a problem in that dissolution disconnection is caused for the gate signal line using an Al alloy, since the etching solution used for fabrication is a strong halogenic acid, such as hydrobromic acid. On the other hand, while an IZO film or an IGO film does not bring about dissolution disconnection for the gate signal line using an Al alloy, since the etching solution for the fabrication is a mild chemical, such as oxalic acid, it involves a problem in that the terminal connection resistance tends to increase. In some cases, COG mounting is difficult. When ITZO is adopted, the problems of the welding disconnection of the gate signal line and the terminal connection resistance can be overcome in a balanced manner.

Then, the drain terminal 12 thus constituted is connected, as shown in FIG. 4B, with a bump 44 of the semiconductor integrated circuit 11 by way of an anisotropic conductive film 43. The anisotropic conductive film 43 comprises a sheet-like resin film containing many conductive particles, and the bump 44 and the conductive material (conductive oxide film 42) of the drain terminal portion 12 are electrically connected by way of the conductive particles by applying a certain pressure while interposing the resin film between the combination of the drain terminal portions 12 and the semiconductor integrated circuit 11.

<Manufacturing Method>

Next, a method of manufacturing the portions on the side of the transparent substrate 1 of the liquid crystal display device, as described above, will be explained with reference to FIGS. 5A through 5D to FIGS. 9A through 9D. In FIGS. 5A through 5D to FIGS. 9A through 9D, a thin film transistor portion (FIGS. 5A through 9A), a gate terminal portion (FIGS. 5B through 9B), a drain terminal portion (FIGS. 5C through 9C) and process flow steps (FIGS. 5D through 9D) are shown.

FIGS. 5A through 5D to FIGS. 9A through 9D are divided corresponding to respective photolithographic steps, in which each figure shows a stage where fabrication after photolithography is completed and a photoresist is removed. The term "photolithography" refers to a series of operations from the coating of a photoresist, the selective exposure using a mask and the development thereof in this explanation, while avoiding duplicated explanations. A description will be made in accordance with the divided steps.

First photolithographic step, FIGS. 5A to 5D:

In each thin film transistor portion (FIG. 5A), gate terminal portion (FIG. 5B) and drain terminal portion (FIG. 5C), an AlNd alloy layer that is 2000 Å in thickness is formed by sputtering on a transparent substrate 1 made of AN 635 glass (trade name), and, further, an MoZr alloy layer that is 400 Å in thickness is further formed continuously by sputtering. After photolithography, the MoZr alloy layer and the AlNd alloy layer are etched collectively and selectively by an etching solution comprising, for example, phosphoric acid, nitric acid, acetic acid, purified water or ammonium fluoride.

Thus, gate electrodes 45, gate signal lines 4, gate terminal portions 10, terminal portions 13 on the input side of a semiconductor integrated circuit 9, terminal portions 17 connected to the terminal portions 13 by way of a wiring layer 15, terminal portions 14 on the input side of a semiconductor integrated circuit 11, and terminal portions 18 connected to the terminal portions 14 by way of a wiring layer 16 are formed.

Second photolithographic step, FIGS. 6A to 6D:

An ammonia gas, a silane gas and a nitrogen gas are introduced into a plasma CVD apparatus to form an insulative film 19 made of SiN that is 3500 Å in thickness. Then, a silane gas and a hydrogen gas are introduced into the plasma CVD apparatus to form an intrinsic amorphous Si film 20 that is 1200 Å in thickness, and, subsequently, a hydrogen gas and a phosphine gas are introduced into the plasma CVD apparatus to form the N(+) amorphous Si film 48 that is 300 Å in thickness.

After photolithography, the N(+) amorphous Si film 48, and the intrinsic amorphous Si film 20 are selectively etched using $SF_6$ and $CCl_4$ as dry etching gases to form island-shaped semiconductor layers 20 and 48.

Third photolithographic step, FIGS. 7A to 7D:

An MoW alloy layer that is 2100 Å in thickness is formed by sputtering, and continuously an MoZr alloy layer that is 400 Å in thickness is formed by sputtering. After the photolithographic step, the MoZr alloy layer and the MoW alloy layer are etched collectively and selectively with an etching solution of an identical composition with that for the first lithography. Thus, drain signal lines 5, source electrodes 21, drain electrodes 22 and drain terminals 12 are formed.

The conductive film may be a three layered film comprising, for example, MoZr/AlNd/MoZr, but it is not preferred in view of poor productivity requiring a long film deposition time and a large scale film deposition apparatus that is needed for film deposition to increase the investment cost.

Then, $CCl_4$ and $SF_6$ are introduced to a dry etching apparatus to selectively eliminate the N(+) semiconductor layer 48.

Fourth photolithographic step, FIGS. 8A to 8D:

An ammonia gas, a silane gas and a nitrogen gas are introduced into the plasma CVD apparatus to form a protection insulative film 23 made of SiN and having a film thickness of 0.4 μm. After the photolithography, the SiN film is selectively etched using $SF_6$ as a dry etching gas to pattern the protection insulative film 23 and the insulative film 19. Since MoZr has a sufficient dry etching durability, it is not removed by dry etching, and the SiN film can be etched selectively.

Fifth photolithographic step, FIGS. 9A to 9D:

A transparent conductive film comprising an ITZO film (Indium-Tin-Zinc-Oxide) of 1150 Å is formed by sputtering. After photolithography, the transparent conductive film is selectively etched with an aqueous solution comprising oxalic acid as a main ingredient for the etching solution to form pixel electrodes 7, the uppermost layer 50 of the gate terminal portions 10, the uppermost layer 42 of the drain terminal portions 12, the uppermost layer of the terminal portions 13 and 14 on the input side of a semiconductor integrated circuits 9 and 11, and the uppermost layer of the terminal portions 17 and 18 connected to the terminal portions 13 and 14 by way of wiring layers 15 and 16.

Embodiment 2

Embodiment 2 of this invention will be explained with reference to FIG. 10.

Figure 10:
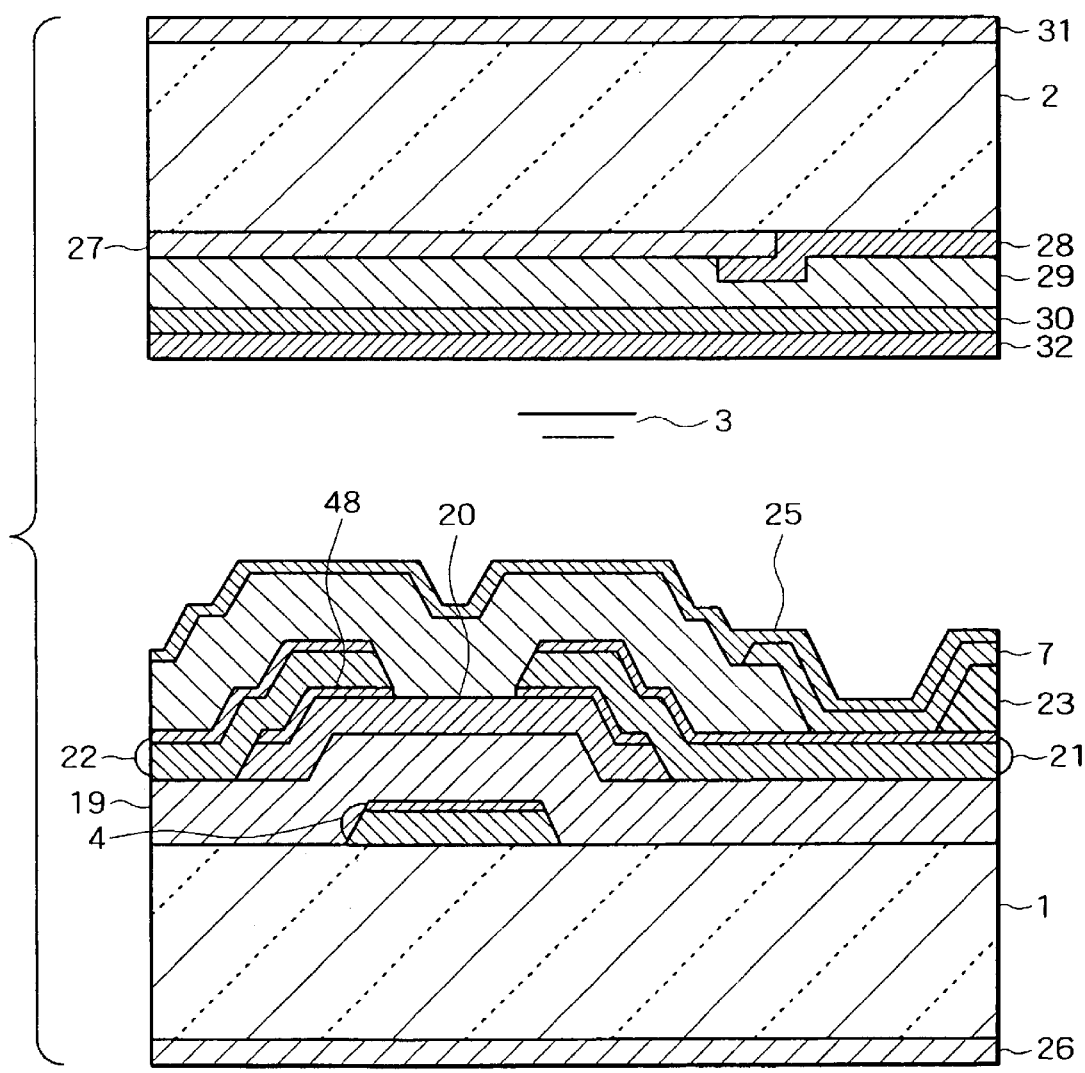
FIG. 10 is a cross sectional view taken along line IV—IV in FIG. 1, showing a main portion of a pixel in a liquid crystal display device according to another embodiment of this invention.

FIG. 10 is a cross sectional view taken along line IV—IV in FIG. 1, similar to that in FIG. 2. FIG. 2 and FIG. 10 are different from each other in that the gate signal line 4 comprises a film formed by laminating an Mo alloy on an Al alloy in FIG. 2, whereas it comprises a film formed by laminating an MoZr alloy on a MoW alloy in FIG. 10. Further, the transparent conductive film used for the pixel electrode 7 comprises ITZO (Indium-Tin-Zinc-Oxide) that can be formed stably into an amorphous film in FIG. 2, whereas it comprises polycrystal ITO (Indium-Tin-Oxide) in FIG. 10.

A film formed by laminating a MoZr alloy on a MoW alloy adopted for the gate signal line 4 is inferior to wirings using an Al alloy in view of the wiring resistance, but it has an advantage of not being chemically attacked even by a strong halogenic acid, such as hydrobromic acid, as an etching solution of polycrystal ITO. Accordingly, polycrystal ITO that has a low and stable terminal connection resistance can be adopted as the uppermost layer for the pixel electrode, the gate terminal portion 10, the drain terminal portion 12, and the other terminal portions 13, 14, 17, and 18 formed simultaneously therewith.

Embodiment 3

In the embodiments described above, while the explanation has been directed to a so-called vertical electric field system for the constitution of the pixels, the invention is not restricted thereto and is applicable also, for example, to an in-plane-switching system.

Figure 11:
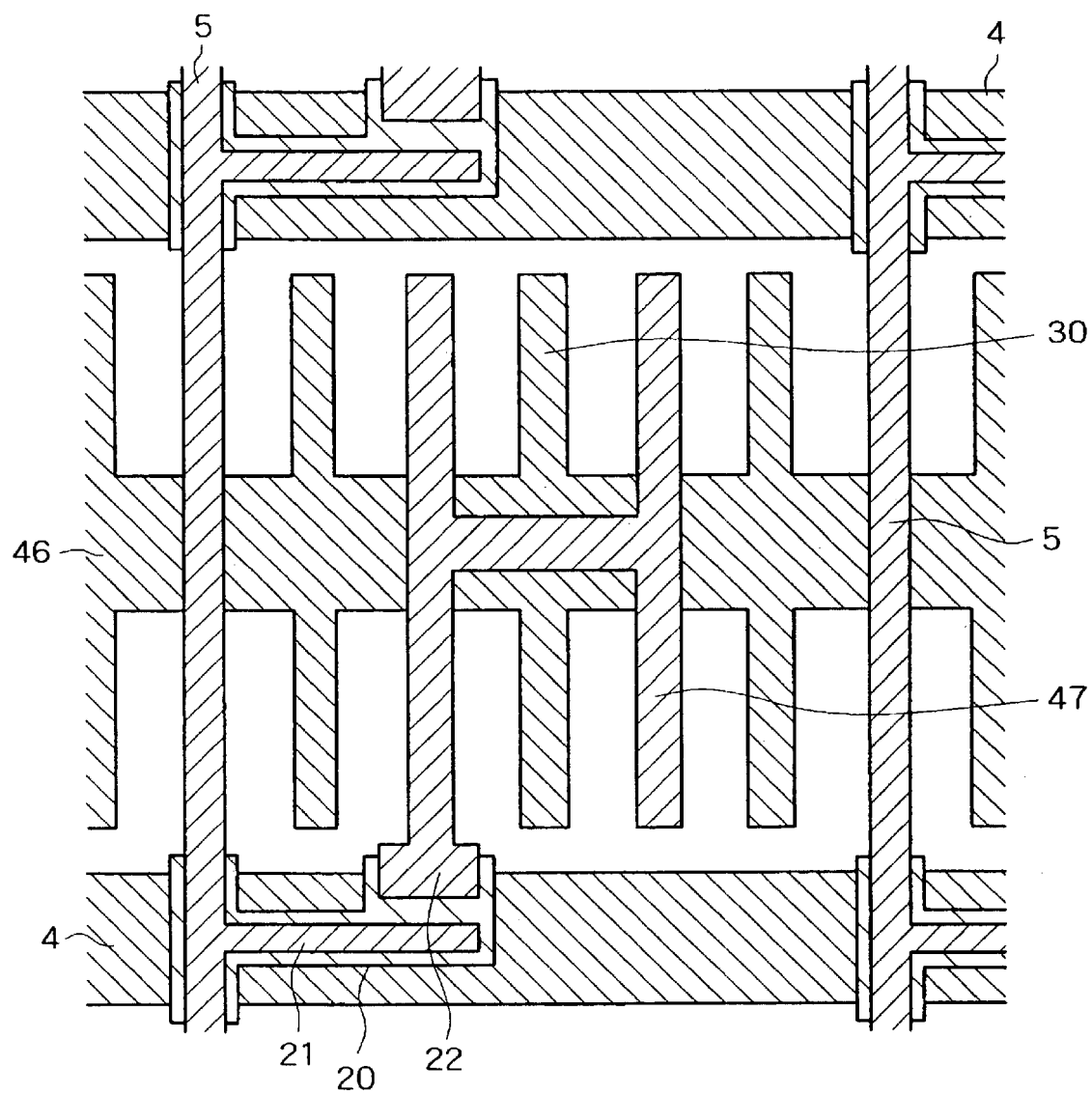
FIG. 11 is a plan view showing the constitution of a main portion of a pixel in a liquid crystal display device according to a further embodiment of this invention.

FIG. 11 is a plan view showing the constitution of pixels in a liquid crystal display device using an in-plane-switching system.

In this system, a counter electrode 30 is formed on the surface of a transparent substrate 1 formed with a pixel electrode 47 on the side of the liquid crystal layer and the respective electrodes are arranged alternately in a stripe-shaped pattern (extend in the direction y in the drawing).

The pixel electrode 47 and the counter electrode 30 are formed on different layers separated by an insulative film. The transmittance of the liquid crystals is controlled by an electric field which has a component substantially in parallel with the transparent substrate 1, among the electric fields generated therebetween.

Each of the pixel regions is formed at a region surrounded by a pair of adjacent gate signal lines 4, that extend in the direction x and are arranged in parallel along the direction y, and each of the drain signal lines 5, that extend in the direction y and are arranged in parallel along the direction x. The constitution is identical with that shown in FIG. 1 in that the drain signal lines 5 are connected by way of the thin film transistor TFT to the pixel electrode 47, but it is different in that a counter voltage signal line 46 for supplying a counter voltage signal to each of the counter electrodes 30 is additionally formed.

Figure 12:
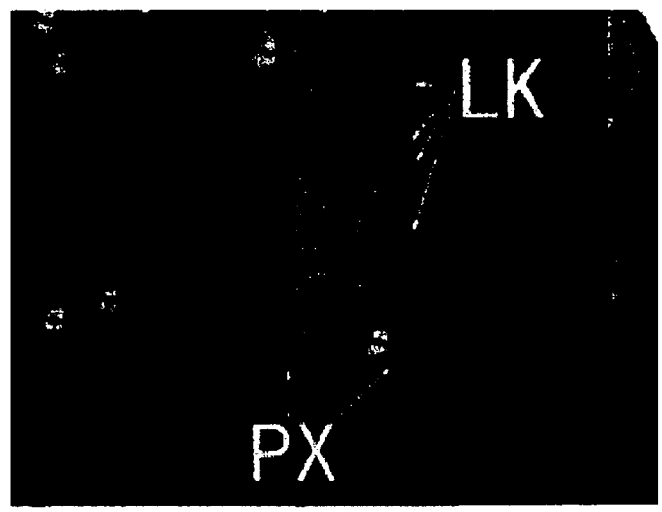
FIG. 12 is a photograph showing an example of display defects in a liquid crystal display device.
Figure 13:
FIG. 13 is a photograph showing in cross section an example of a pixel electrode in a liquid crystal display device exhibiting the display defect of FIG. 12.

In the case of an in-plane switching system, care has to be taken for the following point. When the cross sectional shape of the pixel electrode 47 is worsened, specifically, the tapered shape is steep, the orientation film on the sides of the electrode sometimes is not rubbed. This brings about a disadvantage in that light leakage occurs at the portion upon black display, to thereby bring about a lowering of the contrast and a degradation of the display quality. FIG. 12 shows a pixel of the in-plane switching system, which is a result of optical microscopic observation upon a black display. It can be seen that the sides of the pixel electrode 47 glisten white (indicated as LK in the drawing). FIG. 13 is a cross sectional view of the pixel electrode 47 (a result of scanning electron microscopic observation). It can be seen that in the wirings containing a steep portion, the side of the electrode glistens white. However, in this embodiment, since the pixel electrode 47 is made of a film formed by laminating a MoZr alloy on a MoW alloy, and the cross section thereof is formed in a forwardly tapered shape, as described above, it is possible to cope with the disadvantage of the lowering of the contrast shown in FIG. 12.

Embodiment 4

Figure 14:
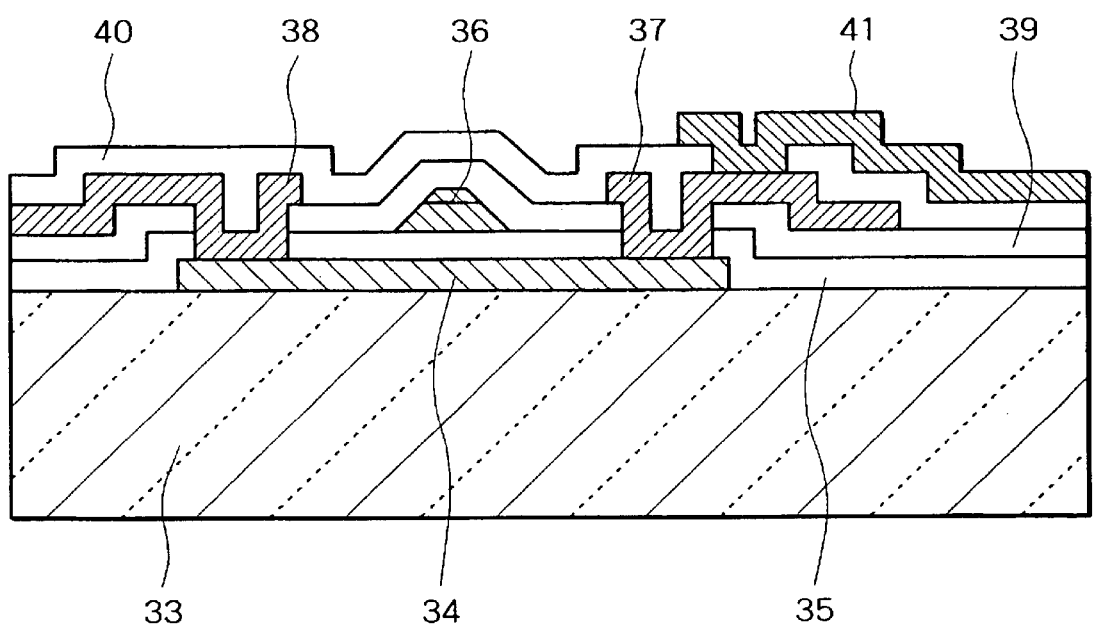
FIG. 14 is a cross sectional view showing the constitution of a main portion of a pixel in a liquid crystal display device according to a still further embodiment of the invention.
Figure 15:
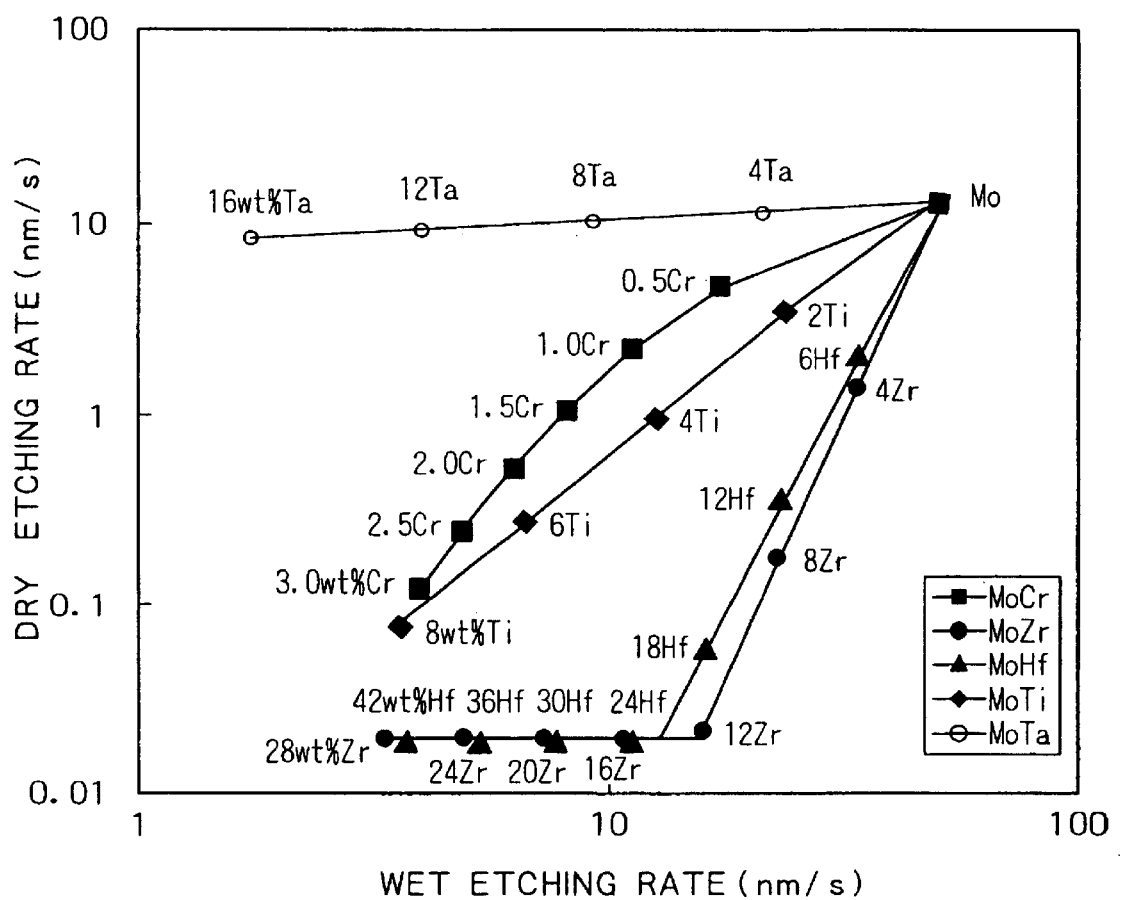
FIG. 15 is a graph showing characteristics of materials intended to be used for signal lines in a liquid crystal display device.
Figure 16:
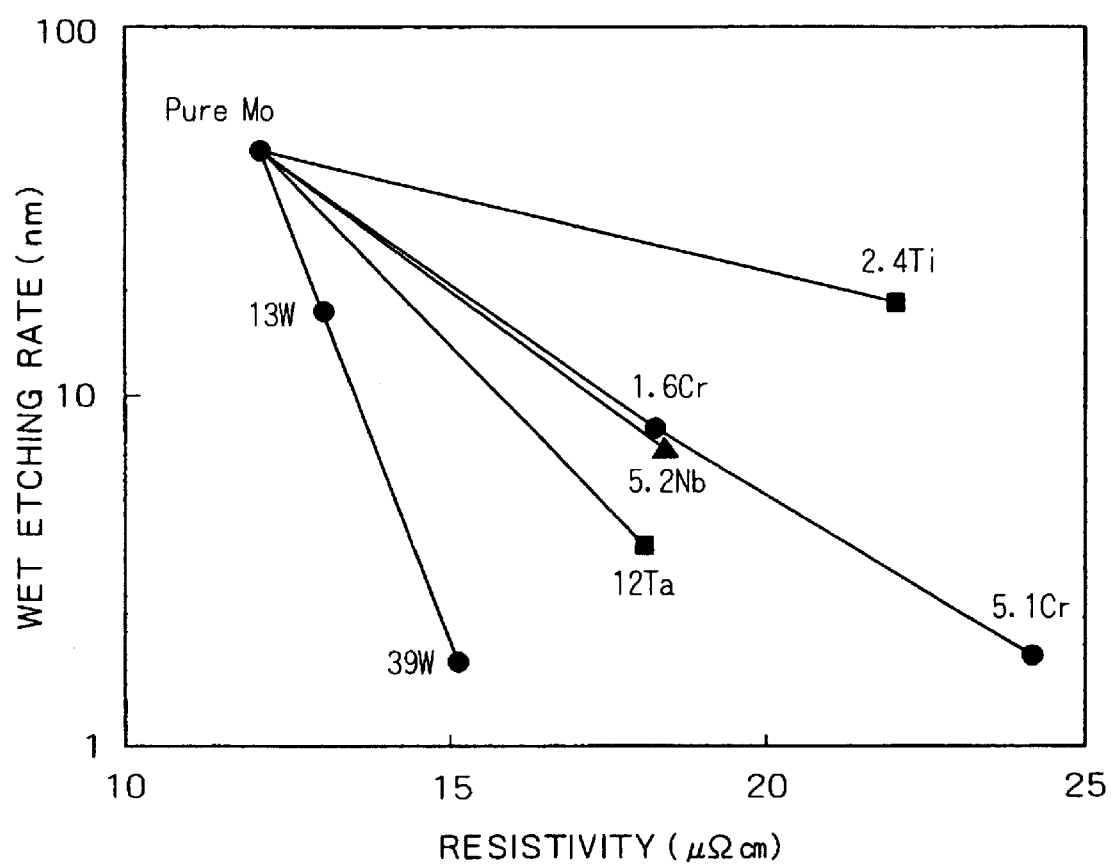
FIG. 16 is a graph showing characteristics of materials intended to be used for signal lines in a liquid crystal display device.
Figure 17:
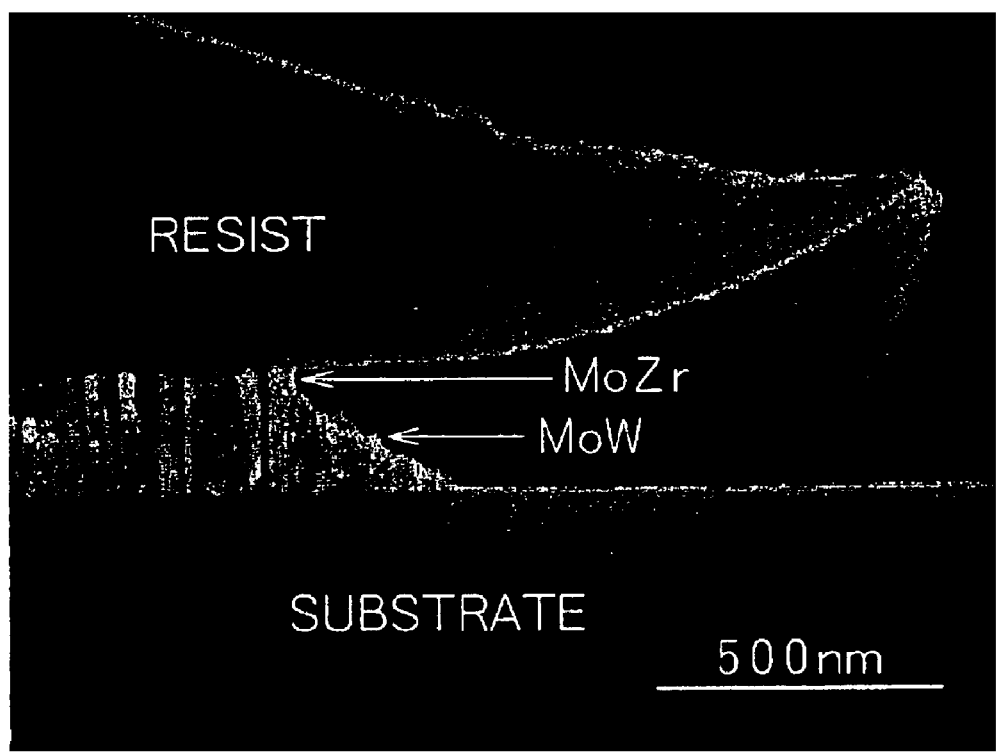
FIG. 17 is a photograph showing the cross-sectional shape of a two-layered film to be used for signal lines in a liquid crystal display device.

In the embodiment described previously, an example of a so-called bottom gate type is used in the constitution of the thin film transistor TFT. This invention is not restricted thereto, but also is applicable to a so-called coplanar type thin film transistor. A fourth embodiment of this invention will be explained with reference to FIG. 14.

After forming an island of polycrystal silicon 34 on a substrate 33 overcoated at least with one of $SiO_2$ or SiN, a gate insulative film 35 comprising, for example, $SiO_2$ is formed.

Then, a gate electrode 36 is formed. In this embodiment, the gate electrode 36 is made of a laminated film comprising an alloy, as a lower layer, containing Mo as a main ingredient and W, and an alloy, as an upper layer, containing Mo as a main ingredient and Zr. The total film thickness is about 200 nm.

The n-channel is formed by the following procedures. After forming a resist pattern by photolithography, the laminated film is side etched by about 1 μm from a resist edge. The etching solution is a mixed acid of phosphoric acid, nitric acid and acetic acid, which is also used in Embodiment 1. Then, intense doping is applied to the polycrystal silicon 34 without removing the resist, and, successively, the resist is removed and weak doping is applied. Thus, a weakly doped region can be formed in polycrystal silicon in a self-aligned manner. In usual wet etching, when side etching is applied by about 1 μm, the processed cross sectional shape forms a vertical shape. Further, it forms an inverted tapered shape in some places, and a non-doped region is formed sometimes in the vicinity of the electrode. However, when a film formed by laminating a MoZr alloy on a MoW alloy is used, as in this embodiment, the cross section is formed into a forward tapered shape, as described above. Accordingly, the problem of forming a non-doped region can be eliminated, and the coverage of the film formed thereon is favorable.

As has been described above, after forming the gate electrode, an interlayer insulative film 39 made, for example, of $SiO_2$ is formed. Subsequently, a through hole is formed at a portion of the region of the intensely doped polycrystal silicon 34. Successively, the source electrode 37 and the drain electrode 38 are formed. Next, an interlayer insulative film 40, formed by laminating SiN, $SiO_2$ or an organic insulator, or at least two or more of them, is formed. Successively, after forming a contact hole in the interlayer insulative film 40, a pixel electrode 41 is formed to complete a thin film transistor substrate.

Although the invention has been described with reference to several preferred embodiments, it is to be understood that the invention should not be restricted to the described embodiments and may be modified or improved variously within a range that those skilled in the art can recognize. The scope of the invention is not restricted to the details shown and described above, but includes also the modifications and improvements described above. For example, it will be apparent that the thin film transistor substrate described in the foregoing embodiments is applicable not only to a liquid crystal display device, but also to an organic LED (Light Emission Diode) display device.

This invention provides a liquid crystal display device having image signal lines of a bottom gate type TFT capable of satisfying respective requirements for reduced resistance, durability to dry etching, selective wet etching with respect to a gate insulative film, the number of laminated layers of two or less and a tapered fabrication for a cross section. In turn, it can provide a liquid crystal display device having satisfactory characteristics.

What is claimed is:

1. A liquid crystal display device comprising
   a pair of substrates;
   a liquid crystal layer put between the pair of substrates;
   a plurality of scanning signal lines formed on one of the pair of substrates;
   a plurality of image signal lines crossing the scanning signal lines in a matrix arrangement;
   thin film transistors formed in the vicinity of intersections of the scanning signal lines and the image signal lines;
   pixel electrodes connected with the thin film transistors;
   a gate insulative film substantially covering the scanning signal lines; and
   a protection insulative film substantially covering the image signal lines and the thin film transistors,
   wherein at least one of the scanning signal lines and the image signal lines is made of a two-layered film of a first conductive film as a lower layer and a second conductive film as an upper layer,
   the first conductive film is made of an alloy comprising molybdenum as a main ingredient and containing tungsten, and
   the second conductive film is made of an alloy comprising molybdenum as a main ingredient and containing zirconium.

2. A liquid crystal display device as defined in claim 1, wherein
   the first conductive film is made of an alloy comprising molybdenum as a main ingredient and containing tungsten, and
   the second conductive film is made of an alloy comprising molybdenum as a main ingredient and containing 4% by weight or more of zirconium.

3. A liquid crystal display device as defined in claim 1 or 2, wherein
   average conductivity defined as a product of sheet resistance and the entire film thickness of the two-layered film is 170 nΩ/m or less.

4. A liquid crystal display device as defined in claim 1 or 2, wherein
   a cross section formed at a fabrication end of the first conductive film forms a forwardly tapered shape.

5. A liquid crystal display device comprising;
   a pair of substrates;
   a liquid crystal layer put between the pair of substrates;
   a plurality of scanning signal lines formed on one of the pair of substrates;
   a plurality of image signal lines crossing the scanning signal lines in a matrix arrangement;
   thin film transistors formed in the vicinity of intersections of the scanning signal lines and the image signal lines;
   pixel electrodes connected with the thin film transistors;
   a gate insulative film substantially covering the scanning signal lines; and
   a protection insulative film substantially covering the image signal lines and the thin film transistors, wherein the image signal lines and a source and drain electrodes of the thin film transistor made of a two-layered film of a first conductive film as a lower layer and a second conductive film as an upper layer, the first conductive film is directly connected with silicon constituting the thin film transistor, the second conductive film is directly connected with the pixel electrode by way of a through hole disposed in the protection insulative film, the first conductive film is made of an alloy comprising molybdenum as a main ingredient and containing tungsten and the second conductive film is made of an alloy containing zirconium.

6. A liquid crystal display device as defined in claim 5, wherein the first conductive film is made of an alloy comprising molybdenum as a main ingredient and containing tungsten, and the second conductive film is made of an alloy comprising molybdenum as a main ingredient and containing 4% by weight or more of zirconium.

7. A liquid crystal display device as defined in claim 5 or 6, wherein average conductivity defined as a product of sheet resistance and the entire film thickness of the two-layered film is 170 nΩ/m or less.

8. A liquid crystal display device as defined in claim 5 or 6, wherein a cross section at a fabrication end of the first conductive film forms a forwardly tapered shape.

9. A liquid crystal display device as defined in claim 5 or 6, wherein the scanning signal line is made of a laminated film of an alloy comprising aluminum the main ingredient and an alloy comprising molybdenum as a main ingredient.

10. A liquid crystal display device as defined claim 9, wherein the pixel electrode is made of a mixed oxide of indium oxide, tin oxide and zinc oxide.

11. A liquid crystal display device comprising;

a pair of substrates;

a liquid crystal layer put between the pair of substrates;

a plurality of scanning signal lines formed on one of the pair of substrates;

a plurality of image signal lines crossing the scanning signal lines in a matrix arrangement;

thin film transistors formed in the vicinity of intersections of the scanning signal lines and the image signal lines;

a gate insulative film substantially covering the scanning signal lines;

a protection insulative film substantially covering the image signal lines and the thin film transistors; and at least a pair of pixel electrodes and counter electrodes formed on one of the pair of substrates within a plurality of pixels formed in regions surrounded with the plurality of scanning signal line and the plurality of image signal lines, wherein an image signal is supplied to the pixel electrode by way of the thin film transistor driven based on the supply of a scanning signal from the scanning signal line, a reference voltage is supplied to the counter electrode by way of the counter voltage signal line formed over the plurality of pixels, and the pixel electrode is made of a two-layered film of a first conductive film as a lower layer and a second conductive film as an upper layer, wherein the first conductive film is made of an alloy comprising molybdenum as a main ingredient and containing tungsten, and the second conductive film is made of an alloy containing zirconium.

12. A liquid crystal display device as defined in claim 11, wherein the first conductive film is made of an alloy comprising molybdenum as a main ingredient and containing tungsten, and the second conductive film is made of an alloy comprising molybdenum as a main ingredient and containing 4% by weight or more of zirconium.

13. A liquid crystal display device as defined in claim 11 or 12, wherein average conductivity defined as a product of sheet resistance and the entire film thickness of the two layered film is 170 nΩ/m or less.

14. A liquid crystal display device as defined in claim 11 or 12, wherein a cross section at a fabrication end of the first conductive film forms a forwardly tapered shape.

15. A liquid crystal display device comprising;

a pair of substrates;

a liquid crystal layer put between the pair of substrates;

a plurality of scanning signal lines formed on one of the pair of substrates;

a plurality of image signal lines crossing the scanning signal lines in a matrix arrangement;

thin film transistors formed in the vicinity of intersections of the scanning signal lines and the image signal lines;

pixel electrodes connected with the thin film transistors;

a gate insulative film substantially covering polycrystal silicon of the thin film transistors;

an interlayer insulative film for substantially covering the scanning signal lines and insulating the scanning signal lines from the image signal lines; and a protection insulative film substantially covering the image signal lines, wherein a gate electrode of the thin film transistor is formed of a two-layered film of a first conductive layer as a lower layer and a second conductive layer as an upper layer, the first conductive film is made of an alloy comprising molybdenum as a main ingredient and containing tungsten, and the second conductive film is made of an alloy containing zirconium.

* * * * *